US008792462B2

(12) United States Patent
Bajzec et al.

(10) Patent No.: US 8,792,462 B2
(45) Date of Patent: Jul. 29, 2014

(54) RADIO BASE STATION AND METHOD FOR SWITCHING TTI BUNDLING

(75) Inventors: Zelimir Bajzec, Sundbyberg (SE); Ying Sun, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/521,162

(22) PCT Filed: Jun. 11, 2012

(86) PCT No.: PCT/EP2012/061009
§ 371 (c)(1),
(2), (4) Date: Sep. 14, 2012

(87) PCT Pub. No.: WO2013/185799
PCT Pub. Date: Dec. 19, 2013

(65) Prior Publication Data
US 2013/0329701 A1    Dec. 12, 2013

(51) Int. Cl.
*H04W 72/04*    (2009.01)
*H04W 84/18*    (2009.01)
(52) U.S. Cl.
CPC ................................... *H04W 84/18* (2013.01)
USPC ........................................................ 370/336
(58) Field of Classification Search
CPC .. H04B 7/18523; H04W 84/18; H04W 84/12; H04W 72/04; H04W 88/08; H04W 76/00
USPC .................. 370/336, 329, 328, 310
See application file for complete search history.

(56) References Cited

U.S. PATENT DOCUMENTS

2010/0070816 A1*    3/2010    Park et al. ...................... 714/748
2011/0075611 A1*    3/2011    Choi .............................. 370/329
2011/0243012 A1*    10/2011   Luo et al. ....................... 370/252
2013/0010709 A1*    1/2013    Earnshaw et al. ............. 370/329
2013/0128849 A1*    5/2013    Wengerter et al. ............ 370/329

FOREIGN PATENT DOCUMENTS

EP             2 184 883 A2       5/2010

OTHER PUBLICATIONS

Philips: "Review of CIF Reconfiguration" 3GPP Draft, R1-103365, 3rd Generation Partnership Project (3GPP), Mobile Competence Centre, vol. RAN WG1, XP05042044, May 15, 2010, 6 pages.

(Continued)

*Primary Examiner* — Andrew Lai
*Assistant Examiner* — Zhiren Qin
(74) *Attorney, Agent, or Firm* — Rothwell, Figg, Ernst & Manbeck, P.C.

(57) ABSTRACT

A radio base station (RBS), such as an eNodeB, for supporting TTI bundling transmissions from a User Equipment (UE) using is provided. The RBS is arranged for toggling a TTI bundling mode of the UE by transmitting a first signal (531) to the UE, and for receiving a second signal (538) from the UE indicating that the UE has toggled its TTI bundling mode. During the transition state of the switching procedure, between transmitting the first signal and receiving the second signal, all transmissions from the UE are scheduled as TTI bundling transmissions (532, 536), transmissions received from the UE are decoded at time instances for both normal transmissions (511) and TTI bundling transmissions (512), and feedback information is transmitted to the UE at time instances for both normal transmissions (534) and TTI bundling transmissions (535). In this way, all packets received at the RBS may be decoded correctly and retransmission of packets by the UE is avoided. Further, a corresponding method is provided.

18 Claims, 3 Drawing Sheets

(56) References Cited

OTHER PUBLICATIONS

NTT Docomo et al. "UE Assignment Methods During CIF Configuration" 3GPP Draft, R2-101537, 3rd Generation Partnership Project (3GPP), Mobile Competence Centre, vol. RAN WG2, XP050421787, Feb. 16, 2010, 5 pages.

Ericsson: "Synchronized RRC re-configuration" 3GPP Draft, R2-081489, 3rd Generation Partnership Project (3GPP), Mobile Competence Centre, vol. RAN WG2, XP050139230, Mar. 24, 2008, 4 pages.

* cited by examiner

200

500

RADIO BASE STATION AND METHOD FOR SWITCHING TTI BUNDLING

CROSS REFERENCE TO RELATED APPLICATION(S)

This application is a 35 U.S.C. §371 National Phase Entry Application from PCT/EP2012/061009, filed Jun. 11, 2012, designating the United States, the disclosure of which is incorporated by reference herein in its entirety.

TECHNICAL FIELD

The invention relates to a Radio Base Station (RBS) for supporting uplink transmissions from a User Equipment (UE) using Transmission Time Interval (TTI) bundling and being arranged for toggling a TTI bundling mode of the UE, and a corresponding method. Further, a computer program and a computer program product are provided.

BACKGROUND

Cellular communication networks evolve towards higher data rates, together with improved capacity and coverage. In the 3rd Generation Partnership Project (3GPP), the latest technology standard, Long Term Evolution (LTE), is currently being developed and standardized.

LTE uses an access technology based on Orthogonal Frequency Division Multiplexing (OFDM) for the downlink, and Single Carrier Frequency Division Multiplexing Access (SC-FDMA) for the uplink. The allocation of radio resources to mobile terminals, referred to as User Equipments (UEs), for both downlink and uplink is performed by a scheduler located in the access node of the Evolved Universal Terrestrial Radio Access Network (E-UTRAN), the E-UTRAN Node B, commonly abbreviated as eNodeB. The Resource allocation is performed adaptively using fast scheduling, taking into account the instantaneous traffic pattern and radio propagation characteristics for each UE.

In LTE, all packets are delivered using the Internet Protocol (IP). This means that also traditionally circuit switched services, such as voice, will make use of fast scheduling. Since the TTI used in LTE is much shorter than in other wireless technologies, like Global System for Mobile Communications (GSM) and Wideband Code Division Multiple Access (WCDMA), the energy received at the eNodeB will not be sufficient for transmitting a Voice over IP (VoIP) packet, unless the transmission power at the UE is increased. The current solution, which is standardized by the 3GPP, is to segment the VoIP packet into small pieces, transport blocks, and to retransmit the same packet in four consecutive subframes, TTIs, before the feedback of earlier transmissions is received and processed. The soft combining gain is achieved by combining the consecutive transmissions. The Round Trip Time (RTT) for TTI bundling is 16 ms, according to 3GPP specifications. It is further specified that four HARQ processes are used for TTI bundling transmissions, as compared to eight HARQ processes for normal transmissions. When a UE receives an uplink grant, it will invoke the same HARQ process for the consecutive four subframes.

One of the benefits of TTI bundling is a lower overhead due to reduced segmentation and an reduced signaling of lower-layer headers, such as Radio Link Control (RLC) and Medium Access Control (MAC) headers. In addition to that, Layer 1 and Layer 2 messaging is reduced since fewer grants are needed to transmit the same amount of Layer 2 bits. However, since it is not favorable to let UEs which do not segment their VoIP packets use TTI bundling, because of the increased usage of radio resources, a mixture of UEs using TTI bundling and UEs not using TTI bundling within the same cell is expected in realistic scenarios.

In order to switch from normal transmission mode to TTI bundling transmission mode, or vice versa, the eNodeB sends a Radio Resource Control (RRC) Reconfiguration Request signal to the UE, ordering the UE to toggle its TTI bundling mode. In response to the request, the UE toggles its TTI bundling mode and transmits an RRC Reconfiguration Complete signal to the eNodeB. During the time interval between transmitting the request to the UE and receiving the confirmation from the UE, the eNodeB has no knowledge about the current TTI bundling mode of the UE. The UE behavior during the switching period, i.e., between receiving the request from the eNodeB and transmitting a confirmation to the eNodeB, is not well specified. This uncertainty may give rise to problems due to differences between normal transmissions and TTI bundling transmissions, which are related to allocating Physical Uplink Shared Channel (PUSCH) resources, transmitting Hybrid Automatic Repeat Request (HARQ) feedback information, and the mapping of HARQ processes in the eNodeB and the UE, respectively.

In particular, problems may arise if the UE transmits data during an ongoing switching of TTI bundling, i.e., between receiving the RRC Reconfiguration Request and transmitting the RRC Reconfiguration Complete. Since the UE is required to transmit the RRC Reconfiguration Complete using the configuration after the reconfiguration procedure, while data not related to the reconfiguration procedure is transmitted according to the configuration prior to the reconfiguration procedure, the eNodeB has no means of knowing whether data which is received during an ongoing switching procedure was transmitted using TTI bundling or not.

A known solution to overcome this uncertainty is to perform an intra-cell handover at the same time as switching TTI bundling. For this purpose, a handover command is included in the RRC Reconfiguration Request signal. When the UE receives the request, it will start a handover procedure to its own cell while simultaneously toggling its TTI bundling mode. More specifically, the UE sends Random Access (RA) preambles, and the eNodeB schedules an RA Msg3 grant in the RA Msg2, in response to which the UE sends RA Msg3. When the eNodeB receives RA Msg3, it knows that the UE has successfully toggled its TTI bundling mode, and it can schedule the UE according to the new TTI transmission mode. However, while this solution provides a robust way to avoid the uncertainty associated with switching TTI bundling, it gives rise to extensive RA messaging, thereby reducing the overall RA success rate of the system. This, in turn, may result in an increased interference caused by UEs increasing their transmit power in response to failed RA attempts.

SUMMARY

It is an object of the present invention to provide an improved alternative to the above techniques and prior art.

More specifically, it is an object of the present invention to provide an improved switching of TTI bundling.

These and other objects of the invention are achieved by means of different aspects of the invention, as defined by the independent claims. Embodiments of the invention are characterized by the dependent claims.

For the purpose of describing the invention, the terms RBS and UE are used, where it is assumed that they are capable of supporting uplink transmissions, from the UE to the RBS, using TTI bundling. To this end, an RBS is an access node of a Radio Access Network (RAN), e.g., E-UTRAN, such as a NodeB or an eNodeB. A UE may be a mobile terminal, a mobile phone, a wireless transmit/receive unit, or the like. It is further assumed that a UE supports two modes related to TTI bundling. In normal transmission mode, the UE transmits data to the RBS without using TTI bundling. In TTI bundling mode the UE transmits data to the RBS using TTI bundling. A UE may toggle its TTI bundling mode from normal transmission mode to TTI bundling transmission mode, or vice versa, on request by the RBS. This is also referred to as switching TTI bundling.

According to a first aspect of the invention, an RBS is provided. The RBS is arranged for supporting uplink transmissions from a UE using TTI bundling. The RBS is arranged for transmitting a first signal to the UE, thereby requesting the UE to toggle a TTI bundling mode of the UE. The RBS is further arranged for receiving a second signal from the UE, which second signal is an indication that the UE has successfully toggled its TTI bundling mode. The second signal is received subsequently to transmitting the first signal. The RBS is further arranged for, during a time interval between transmitting the first signal and receiving the second signal, scheduling uplink transmissions from the UE as TTI bundling transmissions, decoding uplink transmissions received from the UE at time instances for both normal transmissions and TTI bundling transmissions, and transmitting acknowledgement (ACK) signals to the UE at Physical Hybrid Automatic Repeat Request Indicator Channel (PHICH) time instances for both normal transmissions and TTI bundling transmissions.

According to a second aspect of the invention, a method of an RBS for supporting uplink transmissions from a UE using TTI bundling is provided. The method comprises transmitting a first signal to the UE, thereby requesting the UE to toggle a TTI bundling mode of the UE. The method further comprises receiving a second signal from the UE, which second signal is an indication that the UE has successfully toggled its TTI bundling mode. The method further comprises, during a time interval between transmitting the first signal and receiving the second signal, scheduling uplink transmissions from the UE as TTI bundling transmissions, decoding uplink transmissions received from the UE at time instances for both normal transmissions and TTI bundling transmissions, and transmitting ACK signals to the UE at PHICH time instances for both normal transmissions and TTI bundling transmissions.

According to a third aspect of the invention, a computer program is provided. The computer program comprises computer program code. The computer program code is adapted, if executed on a processor, to implement the method according to the second aspect of the invention.

According to a fourth aspect of the invention, a computer program product is provided. The computer program product comprises a computer readable storage medium. The computer readable storage medium has the computer program according to the third aspect of the invention embodied therein.

The present invention is based on the idea that the uncertainty associated with switching TTI bundling transmission mode, i.e., from normal transmissions to TTI bundling transmissions, or vice versa, may be mitigated by a handling uplink transmissions from the UE during an ongoing reconfiguration procedure in a special way. To this end, during the time interval after transmitting a reconfiguration request signal to a UE, ordering the UE to toggle its TTI bundling mode, and before the reconfiguration complete signal is received, the RBS schedules all uplink transmissions from the UE as TTI bundling transmissions, decodes uplink transmissions received from the UE at time instances for both normal transmissions and TTI bundling transmissions, and transmits acknowledgement signals to the UE at PHICH time instances for both normal transmissions and TTI bundling transmissions.

An embodiment of the invention is advantageous in that the problems associated with switching TTI bundling may be avoided or at least mitigated. In particular, when in the transition state, i.e., between transmitting the first signal and receiving the second signal, by scheduling all uplink transmission from the UE using TTI bundling, and by taking time instances for both normal transmission mode and TTI bundling mode into consideration, irrespective of the current TTI bundling mode of the UE and whether the purpose of the reconfiguration procedure is to switch from normal transmission mode to TTI bundling transmission mode or vice versa, all packets received at the RBS may be decoded correctly, and unnecessary re-transmissions by the UE due to missing acknowledgement signals are avoided.

According to an embodiment of the invention, the RBS is further arranged for transmitting grant signals to the UE indicating a new transmission grant. Grant signals indicating a new transmission grant are transmitted during the time interval between transmitting the first signal and receiving the second signal, i.e., when the RBS is in the transition state.

According to an embodiment of the invention, the grant signals comprise a New Data Indicator (NDI) and a Redundancy Version Indicator (RVI). The NDI is toggled in comparison to a current NDI value for the UE, and the RVI is set to zero. This is advantageous in that, when scheduling new uplink transmissions when in the transition state as TTI bundling transmissions, the UE flushes its HARQ buffer and considers the grant as a new transmission grant.

According to an embodiment of the invention, the RBS is further arranged for, during the time interval between transmitting the first signal and receiving the second signal, scheduling uplink transmissions from the UE with a fixed transport block size, a fixed modulation-coding scheme, and using a fixed resource block. Using fixed link adaption with good robustness when in the transition state is advantageous in that the likelihood of correctly decoding transmitted packets at the RBS is increased.

According to an embodiment of the invention, the first signal is a RRC Reconfiguration Request, and the second signal is an RRC Reconfiguration Complete. According to the 3GPP, the RRC reconfiguration procedure is used for switching TTI bundling. However, the invention is not limited to this, and embodiments of the invention based on corresponding procedures for switching TTI bundling, and involving signals other than RRC Reconfiguration Request and RRC Reconfiguration Complete, may be envisaged.

According to an embodiment of the invention, the first signal is transmitted in response to a decision to toggle the TTI bundling mode of the UE. Such a decision may, e.g., be taken by a Radio Resource Management (RRM) unit of the RBS. Optionally, the decision to toggle the TTI bundling mode of the UE may be taken by an external entity entrusted with RRM tasks, such as a Radio Network Controller (RNC) or the like.

According to an embodiment of the invention, the RBS is further arranged for, outside the time interval between transmitting the first signal and receiving the second signal, scheduling uplink transmissions from the UE in accordance with a current TTI bundling mode of the UE, decoding uplink transmissions received from the UE at time instances for either normal transmissions or TTI bundling transmissions, in accordance with the current TTI bundling mode of the UE, and transmitting ACK signals to the UE at PHICH time instances for either normal transmissions or TTI bundling transmissions, in accordance with the current TTI bundling mode of the UE. To this end, the RBS distinguishes three different modes, or states, related to TTI bundling, namely normal transmissions, TTI bundling transmissions, and a transition state in which the RBS resides during an ongoing reconfiguration procedure. When in one of the first two states, the RBS has knowledge of the current TTI bundling mode of the UE, while when in the transition state switching of the UE's TTI bundling mode has been initiated but the reconfiguration procedure is still ongoing, i.e., the RBS has not yet received a confirmation from the UE that the reconfiguration is completed.

According to an embodiment of the invention, the RBS is an eNodeB.

Further objectives of, features of, and advantages with, the present invention will become apparent when studying the following detailed disclosure, the drawings, and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

In the following, embodiments of the invention are described with reference to FIGS. 1 to 5.

Figure 1:
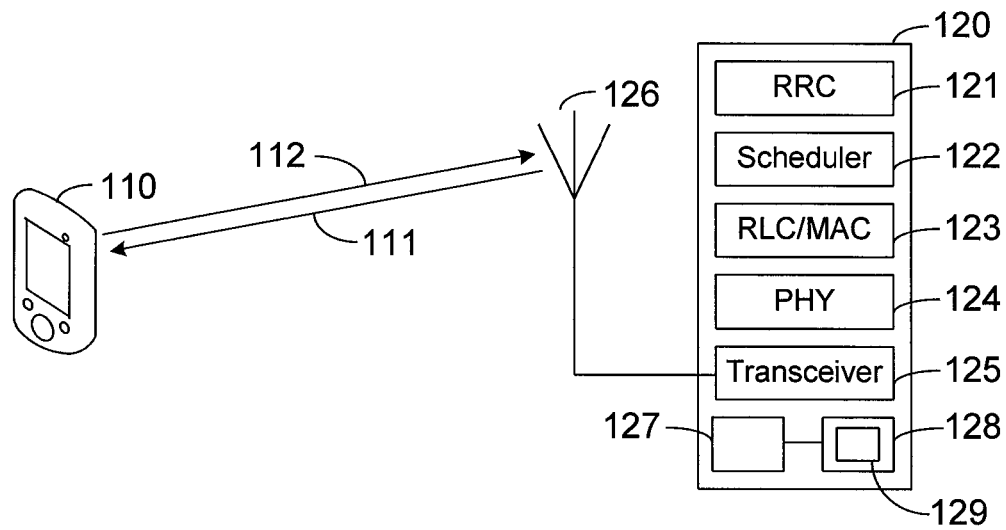
FIG. 1 shows a UE and an eNodeB.

In FIG. 1, an eNodeB 110 is illustrated, which is capable of supporting wireless communications with a UE 120. Wireless communications may be effected both in downlink 111, i.e., from the eNodeB 120 to the UE 110, and in uplink 112, i.e., from the UE 110 to the eNodeB 120. The eNodeB 120 comprises at least the following functional units: an RRC unit 121, a scheduler 122, an RLC/MAC layer 123, a physical (PHY) layer 124, and a radio transceiver 125. The eNodeB 120 further comprises an antenna 126.

The RRC unit 121 implements the RRC protocol of the UMTS protocol stack and handles the control plane Layer 3 signaling between the UE 110 and the eNodeB 120. It provides functionality for connection establishment and release, broadcast of system information, radio bearer establishment, reconfiguration, and release, RRC connection mobility procedures, paging notification and release, and outer loop power control.

The scheduler 122 is responsible for resource allocation, i.e., assigning radio resources, time slots, to UEs, such as UE 110, for both downlink and uplink.

The RLC/MAC layer 123 is responsible for handling Protocol Data Units (PDUs) from upper layers, error correction, concatenation, segmentation, and reassembly, as well as addressing and channel access control.

The PHY layer 124 is responsible for transmitting packets received from the higher layers over the physical medium, in this case the air interface. This is accomplished by means of the radio transceiver 125, comprising a radio transmitter and a radio receiver, and the antenna 126.

The functional units 121 to 125 may be implemented by hardware, software, or any combination thereof. For instance, at least part of the functionality of any one of the functional units 121 to 125 may be implemented using a microprocessor, such as a general purpose processor or a Digital Signal Processor (DSP), executing a computer program comprising computer program code which is adapted, if executed on the processor, to implement an embodiment of the method according to the second aspect of the invention. With reference to FIG. 1, the eNodeB may, e.g., comprise a processor 127 and a memory 128 in which the computer program 129 may be stored for execution by the processor 127.

The computer program may be provided as computer program product comprising a computer readable storage medium having the computer program embodied therein. The computer program may also be downloaded to an eNodeB over a communication network. By providing a computer program implementing an embodiment of the method according to the second aspect of the invention, an existing eNodeB may be modified to perform in accordance with an embodiment of the invention.

It will also be appreciated that the functional units 121 to 125 of the eNodeB 120 may be implemented as separate units or in any combination.

Further with reference to FIG. 1, the UE 110 is capable of effecting uplink transmissions to the eNodeB 120 using TTI bundling or not, in accordance with a configuration parameter signaled by the RRC unit 121 of the eNodeB 120. More specifically, TTI bundling may be switched on or off by means of an RRC reconfiguration procedure. The reconfiguration procedure is initiated by transmitting, from the RRC unit 121, an RRC Reconfiguration Request signal comprising an information element pertaining to a desired TTI bundling mode, i.e., either normal transmission mode or TTI bundling transmission mode. The information element used for this purpose is the Boolean RRC parameter ttiBundling, where 'true' means that the UE 110 should use TTI bundling for uplink transmissions, and 'false' means that the UE 110 should not use TTI bundling for uplink transmissions.

A reconfiguration procedure 200 for switching TTI bundling, i.e., toggling the TTI bundling mode of the UE 110 from normal mode to TTI bundling mode, or vice versa, is illustrated in the following, with reference to FIG. 2.

Figure 2:
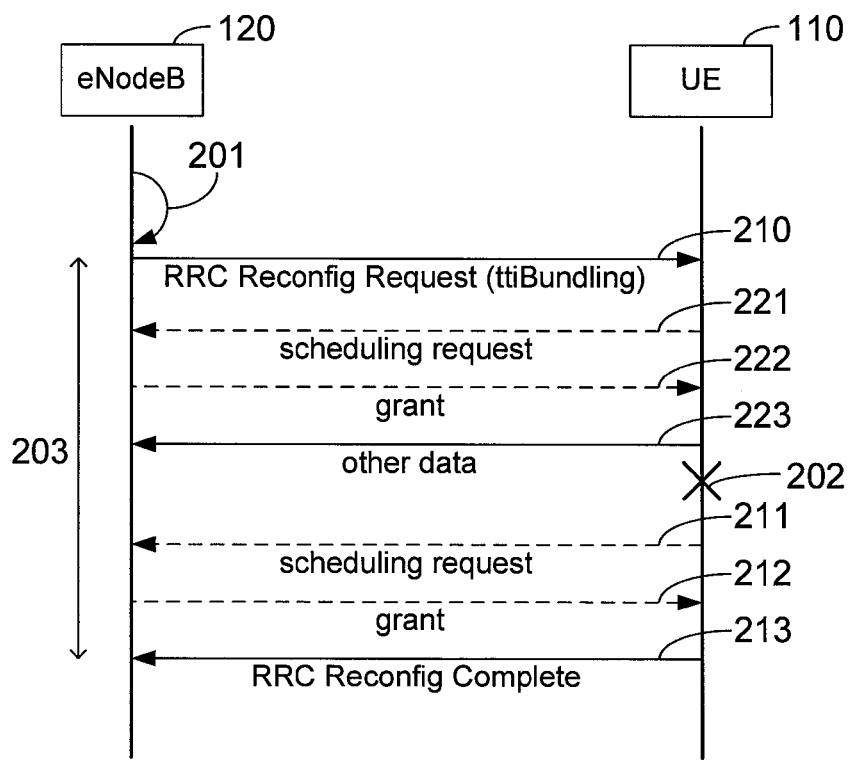
FIG. 2 is a sequence diagram illustrating a reconfiguration procedure for switching TTI bundling.

Reconfiguration procedure 200 illustrated in FIG. 2 is initiated by a decision 201 to toggle the TTI bundling mode of the UE 110. Decision 201 may, e.g., be taken by the RRC unit 121 comprised in the eNodeB or by any external entity, such as an RNC, in communication with the eNodeB 120. The decision to switch TTI bundling may be taken if certain criteria for switching TTI bundling are met. For instance, a UE running VoIP may be reconfigured to use TTI bundling if a filtered channel quality is lower than a threshold value for a certain period of time. Correspondingly, a reconfiguration from TTI bundling transmissions to normal transmissions may be initiated in response to determining that the filtered channel quality exceeds a threshold value for a certain period of time.

Switching, i.e., changing the TTI bundling mode of the UE 110, is typically performed when there are no pending transmissions and HARQ processes. However, if there are still pending transmissions after a certain time interval has lapsed after the switching decision was taken, switching may be performed anyway.

The reconfiguration procedure 200 starts by transmitting an RRC Reconfiguration Request 210 to the UE 110. Among other parameters, the RRC Reconfiguration Request 210 may comprise the information element ttiBundling which is either set to 'true' or 'false'. Upon receiving the RRC Reconfiguration Request 210, the UE 110 attempts to toggle 202 its TTI bundling mode. Depending on the value of ttiBundling received with the RRC Reconfiguration Request 210, and the current TTI bundling mode of the UE 110, the UE 110 attempts to switch TTI bundling on or off, respectively.

Subsequently, under the condition that the UE 110 has successfully toggled 202 its TTI bundling mode, it transmits an RRC Reconfiguration Complete 213 to the eNodeB 120, informing the eNodeB 120 that the reconfiguration procedure is completed, i.e., that the UE 110 has successfully toggled its TTI bundling mode.

Further with reference to FIG. 2, a problem which arises with switching TTI bundling in accordance with the prior art is described in the following. For the sake of simplicity, it is assumed that the UE 110 currently is in normal transmission mode, i.e., uplink transmissions are scheduled without using TTI bundling. The reconfiguration procedure 200 is initiated for the purpose of toggling the TTI bundling mode of the UE 110, i.e., switching TTI bundling on. As part of the reconfiguration procedure 200, the RRC Reconfiguration Request 210 is transmitted from the eNodeB 120 to UE 110. Then, the UE 110 attempts to toggle 202 its TTI bundling mode, as was described hereinbefore, and transmits the RRC Reconfiguration Complete 213, which is subsequently received at the eNodeB 120. First when the RRC Reconfiguration Complete 213 is received at the eNodeB 120, the latter is made aware of the current TTI bundling mode of the UE 110 and may react accordingly. In other words, the eNodeB 120 can only be sure that the UE 110 has successfully performed reconfiguration when the RRC Reconfiguration Complete 213 is received. Until then, the eNodeB 120 does not know whether the UE 110 operates in normal transmission mode or in TTI bundling transmission mode. According to 3GPP, the UE behavior during this transition period is not well specified. In this respect, uplink transmissions 112 from the UE 110 can only be decoded successfully at the eNodeB 120 under the condition that the eNodeB 120 has knowledge of the TTI bundling mode used for the transmission, as will be explained further below.

Further with reference to FIG. 2, in the present example, before transmitting the RRC Reconfiguration Request 210, the eNodeB 120 expects normal uplink transmissions, whereas TTI bundling uplink transmissions are expected after the RRC Reconfiguration Complete 213 has been received. During the ongoing reconfiguration procedure, however, uplink transmissions received at the eNodeB 120 may either be normal transmissions or TTI bundling transmissions. In particular, this is the case since the UE 110 may, during an ongoing switching procedure, transmit data 223 to the eNodeB 120 which is not related to the reconfiguration procedure. Since the UE is required to transmit the RRC Reconfiguration Complete 213 using the configuration after the reconfiguration procedure, while data 223 not related to the reconfiguration procedure is transmitted according to the configuration prior to the reconfiguration procedure, the eNodeB has no means of knowing whether a request for PUSCH resources relates to the RRC Reconfiguration Complete 213 or other data 223.

More specifically, PUSCH resources are requested either by transmitting a scheduling request or by starting an RA procedure. Therefore, if a scheduling request is received after the RRC Reconfiguration Request 210 has been transmitted, the eNodeB 120 cannot know whether the UE 110 attempts to transmit the RRC Reconfiguration Complete 213, by requesting PUSCH resources using scheduling request 211, or other data 223, by requesting PUSCH resources using scheduling request 221. In other words, the eNodeB 120 cannot tell to which transmission a received scheduling request, 211 or 221, respectively, relates. Consequently, the eNodeB 120 does not know whether to grant 222 normal uplink transmissions, for transmitting other data 223, or to grant 212 TTI bundling transmissions, for transmitting the RRC Reconfiguration Complete 213.

This uncertainty inherent to switching TTI bundling in accordance with the prior art has a negative impact on the wireless communications between a UE and an eNodeB during an ongoing reconfiguration procedure, as will be illustrated in the following, with reference to FIG. 3.

Figure 3:
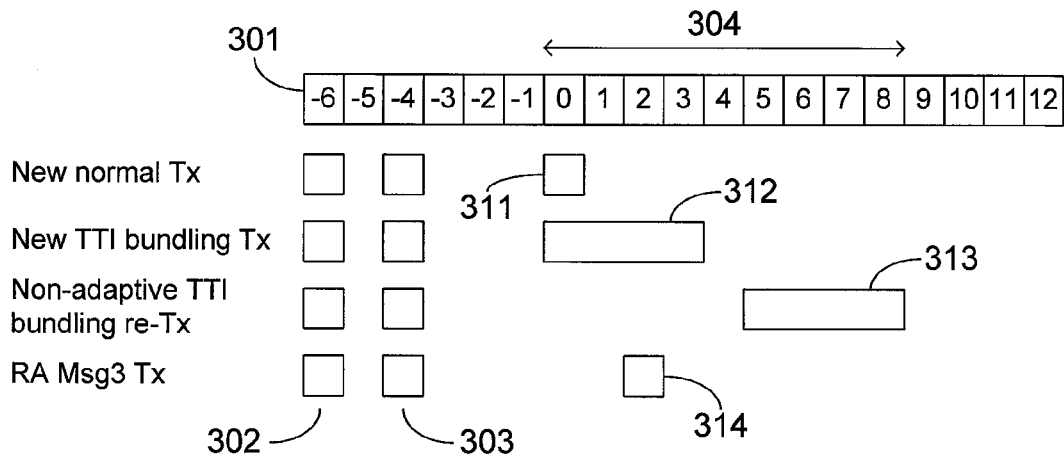
FIG. 3 illustrates resource reservation in the time domain for different types of transmissions.

In FIG. 3, resource reservation for different types of transmissions is illustrated in the time domain. More specifically, it is shown in which of the subframes, i.e., TTIs, 301, a scheduling decision 302 is taken, in which of the subframes 301 a grant 303 is transmitted to the UE, and in which of the subframes 301 a corresponding transmission (Tx) takes place.

For new normal uplink transmissions, i.e., not using TTI bundling, the scheduling decision 302 is taken in subframe −6, also referred to as n−2, where −4 (n) is the subframe in which the grant 303 is transmitted. The transmission 311 takes place in subframe 0 (n+4).

For a new TTI bundling uplink transmission of a bundle, the scheduling decision 302 is taken in subframe −6 (n−2), the grant 303 is transmitted in subframe −4 (n), and the bundle 312 is transmitted in subframes 0 to 3 (n+4 to n+7).

For a retransmission (re-Tx) of a bundle, the decision 301 to make a non-adaptive retransmission is taken in subframe −6 (n). The PHICH NACK is sent in subframe −4 (n) and the bundle is retransmitted in subframes 5 to 8 (n+9 to n+12).

Consequently, the scheduler of the eNodeB has to keep track of resource allocations in subframes 0 to 8 (marked as 304 in FIG. 3) when TTI bundling is used. For normal transmissions, on the other hand, the scheduler only needs to keep track of subframe 0 and, for RA Msg3 314, subframe 2.

The uncertainty related to prior art switching of TTI bundling, as elucidated hereinbefore, may cause problems in the following three situations.

The eNodeB assumes that the UE is in TTI bundling mode and reserve resources for four consecutive subframes (subframes 0 to 3 in FIG. 3), but the UE is in fact in normal transmission mode. In such a situation the reserved PUSCH resources cannot be used and are therefore wasted. Furthermore, the timing for transmitting HARQ feedback information, i.e., ACK or NACK, differs between normal transmission and TTI bundling transmission. In particular, a UE in normal transmission mode expects the PHICH ACK/NACK to arrive four subframes after the previous transmission. In the case of TTI bundling transmissions, on the other hand, the UE expects the feedback information to arrive eight subframes after the previous transmission. According to 3GPP specifications, if the UE has missed the HARQ feedback at the correspondent PHICH instance, a NACK is going to be assumed. As a consequence, the UE will perform non-adaptive retransmission which may cause additional interference.

The eNodeB assumes that the UE is in normal transmission mode, but the UE is in fact in TTI bundling mode. Under such circumstances collisions with other UEs may be expected, causing additional interference.

According to 3GPP, the mapping of HARQ processes is not clearly specified for the TTI bundling transmissions, resulting in a possible mismatch between HARQ processes in the eNodeB and the UE, respectively.

In order to overcome, or at least mitigate, the uncertainty associated with prior art switching of TTI bundling, and the problems resulting from it, a special handling of uplink transmissions from a UE to an eNodeB, such as UE 110 and eNodeB 120, during an ongoing reconfiguration procedure is proposed. The special handling is applied by the eNodeB 120 during a transition period between transmitting an RRC Reconfiguration Request for toggling the TTI bundling mode of the UE, and receiving an RRC Reconfiguration Complete, notifying the eNodeB that switching of the UE's TTI bundling mode was successful. The duration of this transition period 203 is indicated in FIG. 2.

Figure 4:
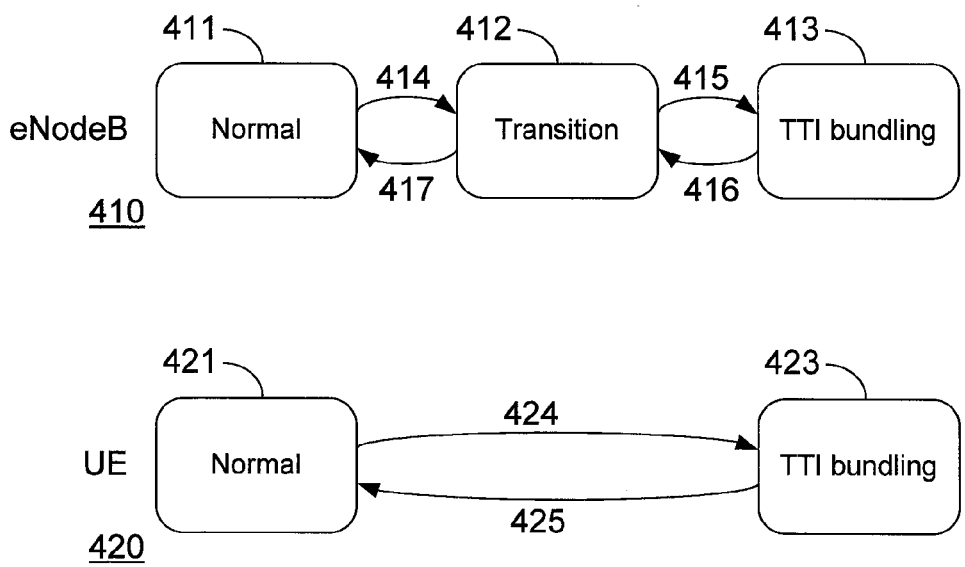
FIG. 4 illustrates state machines for UE and eNodeB, respectively, and state transitions related to switching of TTI bundling, in accordance with an embodiment of the invention.

Switching of TTI bundling in accordance with an embodiment of the invention is now further described with reference to FIG. 4, which visualizes the switching procedure using the notion of state machines. Since TTI bundling is applied on a per-UE basis, en eNodeB in accordance with an embodiment of the invention may use one state machine for each UE in order to keep track of the TTI bundling state of all UEs. For the sake of simplicity, the discussion is limited here to one UE in communication with the eNodeB only. Therefore, when reference is made to a state machine of an eNodeB, this is to be understood as the state machine which is associated with a specific UE.

eNodeB state machine 410 comprises three states, here denoted as 'Normal' 411, 'Transition' 412, and 'TTI bundling' 413. An eNodeB in accordance with an embodiment of invention, such as eNodeB 120, may reside in either one of these states at any time. Assuming that eNodeB 120 currently resides in 'Normal' state 411, i.e., uplink transmissions from the UE 110 are scheduled as non-TTI bundling transmissions, the state machine 410 may transit 414 to the 'Transition' state 412 in response to a decision to activate TTI bundling for the UE 110, as was described hereinbefore. The state transition 414 is accompanied by transmitting an RRC Reconfiguration Request to the UE 110, as was described with reference to FIG. 2.

The eNodeB 120 resides in the 'Transition' state 412 until an RRC Reconfiguration Complete is received from UE 110, as was described hereinbefore, in response to which a state transition 415 to the 'TTI bundling' state 413 is effected. The eNodeB 120 may reside in the 'TTI bundling' state 413 until a decision is taken to switch off TTI bundling for the UE 110, in response to which the eNodeB 120 undergoes a state transition 416 to the 'Transition' state 412, accompanied by initiating a reconfiguration procedure for ordering the UE 110 to toggle its TTI bundling mode from TTI bundling transmissions to normal transmissions. Subsequently, when the reconfiguration procedure is completed, a state transition 417 to the 'Normal' state occurs in response to receiving an RRC Reconfiguration Complete.

UE state machine 420, with which the eNodeB state machine 410 is associated, comprises only two states, here denoted as 'Normal' 421 and 'TTI bundling' 423. Contrary to the eNodeB 120, the UE 110 may reside only in either of these two states since there is no transition period associated with switching TTI bundling. This is due to the fact that the UE 110 toggles its TTI bundling state instantaneously, e.g., from one subframe to the next, and does not suffer from an uncertainty during the switching procedure.

Hence, upon receiving an RRC Reconfiguration Request from the eNodeB 120, ordering the UE 110 to switch to TTI bundling mode, the UE state machine 420 transitions 424 from the 'Normal' state 421 to the 'TTI bundling' state 423 once the switching is effected. The transition 424 is accompanied by responding with an RRC Reconfiguration Complete to the eNodeB 120.

The UE 110 may reside in the 'TTI bundling' state 423 until an RRC Reconfiguration Request is received from the eNodeB 120, ordering the UE 110 to switch to normal transmission mode, in response to which the UE state machine 420 transitions 425 to the 'Normal' state 421. The transition 425 is accompanied by responding with an RRC Reconfiguration Complete to the eNodeB 120.

It will be appreciated by those skilled in the art that the concept of state machines may be implemented using one or more state variables keeping track of the state in which an eNodeB or a UE resides.

Figure 5:
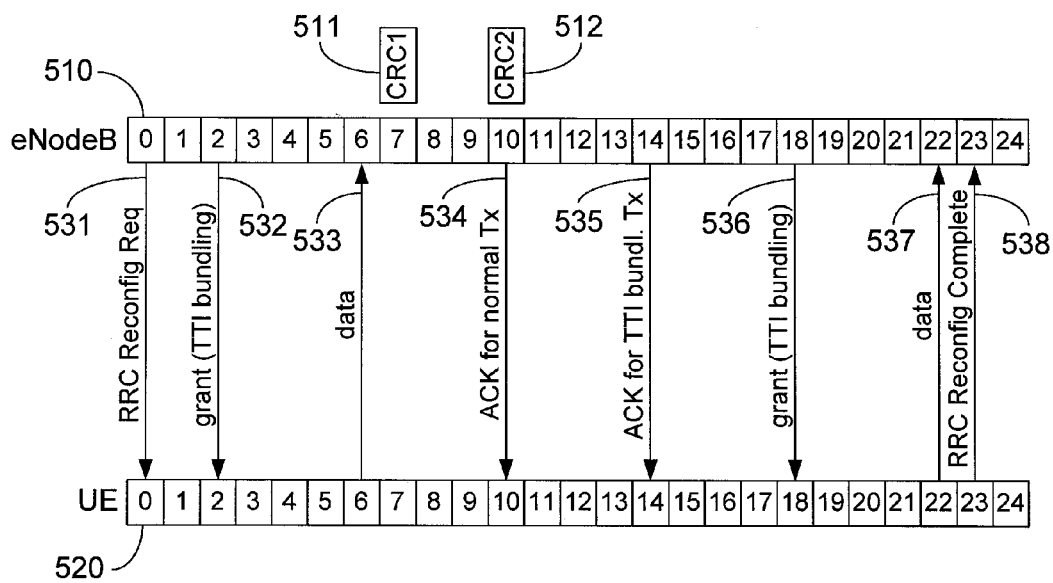
FIG. 5 illustrates signaling and related events during a reconfiguration procedure for switching TTI bundling, in accordance with an embodiment of the invention.

In order to further elucidate the invention, a switching procedure 500 in accordance with an embodiment of the invention is now elucidated with reference to FIG. 5, which illustrates signaling and related events in the time domain by means of a sequence of subframes 510 and 520 from both the eNodeB 120 and the UE 110 perspective, respectively.

In response to a decision to switch the TTI bundling mode of the UE 110 from normal transmissions to TTI bundling transmissions, the eNodeB 120 sends an RRC Reconfiguration Request 531 to the UE 110, ordering the UE 110 to toggle its TTI bundling mode. This starts the transition period during which the eNodeB 120 applies a special handling for uplink transmissions from the UE 110, as was described hereinbefore.

In particular, during the transition period the eNodeB 120 always schedules uplink transmissions from the UE 110 as TTI bundling transmissions. To this end, uplink transmissions are preferably scheduled using a fixed transport block size (e.g., TBS=72 bits), a fixed modulation coding scheme (e.g., MCS=2), and a fixed resource block within each TTI (e.g., RB=2). In addition to that, when a grant 522 is transmitted to the UE 110, NDI is toggled and RVI is set to 0. The TBS value of 72 bits is advantageous in that a good robustness is achieved, thereby increasing the likelihood for correctly decoding packets which are transmitted over the air interface. It is also based on the fact that the RRC Reconfiguration Complete message is rather small, only two bytes. 72 bits is large enough to carry the RRC Reconfiguration Complete in addition to Packet Data Convergence Protocol (PDCP) headers, RLC headers, and MAC headers.

During the transition period, the eNodeB 120, in particular the PHY layer 124, expects to receive and decode data at time instances for both normal transmissions and TTI bundling transmissions. The result of decoding and performing a Cyclic Redundancy Check (CRC) at the first time instance is CRC1 511, and the result of decoding and performing a CRC at the latter time instance 524 is CRC2 512. If the UE 110 is operating in normal transmission mode, and under the condition that the radio conditions are favorable, CRC1 511 will indicate that the received packet was decoded correctly.

CRC2 512, on the other hand, will not be decoded correctly. On the other hand, if the UE 110 is operating in TTI bundling mode, and under favorable radio conditions, CRC2 512 will be decoded correctly.

During the transition period, the eNodeB 120, in particular scheduler 122, will send ACK/NACK to the UE 110 at PHICH time instances 534 and 535 for transmitting feedback information for normal transmissions and TTI bundling transmissions, respectively, irrespective of whether CRC1 511 and CRC2 512 were decoded correctly or not. If the UE 110 operates in normal transmission mode it will receive an ACK 534 and the possible retransmission is pending. The ACK received at time instance 535 is discarded. On the other hand, if the UE 110 operates in TTI bundling mode, it will not listen to the PHICH at the time instance 534 for normal transmissions and the ACK is ignored. The ACK received at the time instance for TTI bundling transmissions 535 is received and the possible retransmission is pending.

At the next subframe which is relevant both for TTI bundling transmissions and normal transmissions, the eNodeB 120, in particular the scheduler 122, will schedule a new transmission grant 536 similar to the previous grant 532, i.e., with toggled NDI and RVI=0, using a fixed TBS, a fixed MCS, and a fixed RB. Upon receiving grant 536, the UE 110 compares the received NDI value with the current value associated with the pending HARQ process. If the NDI is toggled, the UE 110 will flush the HARQ buffer and instruct its PHY layer to multiplex new RLC data. If the NDI is not toggled, the UE 110 will retransmit the data saved in the HARQ buffer using the same MCS and TBS. Further, the UE 110 will update its NDI to the NDI value received with grant 536.

When receiving uplink transmission, the eNodeB 120 attempts to decode the received data using the MCS and TBS as received with the previous grant 532. Under favorable radio conditions, irrespective of whether the UE 110 is retransmitting old data or transmitting new data, the eNodeB 120 may correctly decode the received data and forward the packet to the RLC layer. If the RLC packet is correctly received, the RLC will check the sequence number (SN) and the pollBit. If the pollBit is set for an RLC packet with a different SN, indicating that a new packet is successfully received, an RLC status PDU will be sent. Upon receiving the status PDU, the UE 110 knows that the previous transmission has succeeded and continuous with new transmissions. If the pollBit is set for an RLC packet with the same SN, the packet will be discarded. If the RLC packet is not correctly received, no status PDU is sent. When the UE 110 does not receive a status PDU for a period time which is longer than a certain retransmission time limit, an RLC retransmission is generated for RLC Acknowledged Mode (AM) traffic. The RLC packet may be retransmitted by the lower MAC layer. In RLC Unacknowledged Mode (UM), retransmission is not allowed, and the packet will be lost. There is at maximum one packet loss per HARQ process, since the UE 110 will correct the HARQ state by setting the NDI to the NDI value received in grant 536.

When receiving the RRC Reconfiguration Complete 538 at the eNodeB 120, the transition period is terminated and the eNodeB 120 schedules new transmissions in accordance with the current TTI bundling mode of the UE 110.

The person skilled in the art realizes that the present invention by no means is limited to the embodiments described above. On the contrary, many modifications and variations are possible within the scope of the appended claims.

The invention claimed is:

1. A Radio Base Station, RBS, for supporting uplink transmissions from a User Equipment, UE, using Transmission Time Interval, TTI, bundling, the RBS being arranged for:
    transmitting a first signal to the UE, requesting the UE to toggle a TTI bundling mode of the UE,
    receiving a second signal from the UE, indicating that the UE has successfully toggled the TTI bundling mode of the UE, and
    during a time interval between transmitting the first signal and receiving the second signal:
    scheduling uplink transmissions from the UE as TTI bundling transmissions,
    decoding the uplink transmissions received from the UE at time instances for both normal transmissions and the TTI bundling transmissions, and
    transmitting acknowledgement, ACK, signals to the UE via Physical Hybrid Automatic Repeat Request Indicator Channel, PHICH, at time instances for both normal transmissions and the TTI bundling transmissions.

2. The RBS according to claim 1, being further arranged for, during the time interval between transmitting the first signal and receiving the second signal, transmitting grant signals to the UE indicating a new transmission grant.

3. The RBS according to claim 2, wherein the grant signals comprise a New Data Indicator, NDI, and a Redundancy Version Indicator, RVI, and wherein the NDI is toggled in comparison to a current NDI value for the UE and RVI=0.

4. The RBS according to claim 1, being further arranged for, during the time interval between transmitting the first signal and receiving the second signal, scheduling uplink transmissions from the UE with a fixed transport block size, a fixed modulation-coding scheme, and a fixed resource block.

5. The RBS according to claim 1, wherein the first signal is a Radio Resource Control, RRC, Reconfiguration Request, and the second signal is an RRC Reconfiguration Complete.

6. The RBS according to claim 1, wherein the first signal is transmitted in response to a decision to toggle the TTI bundling mode of the UE.

7. The RBS according to claim 1, being further arranged for, outside the time interval between transmitting the first signal and receiving the second signal:
    scheduling a second uplink transmissions from the UE in accordance with a current TTI bundling mode of the UE,
    decoding the second uplink transmissions received from the UE at time instances for either the normal transmissions or the TTI bundling transmissions, in accordance with the current TTI bundling mode of the UE, and
    transmitting ACK signals to the UE via the PHICH at time instances for either the normal transmissions or the TTI bundling transmissions, in accordance with the current TTI bundling mode of the UE.

8. The RBS according to claim 1, wherein the RBS is an eNodeB.

9. A method of a Radio Base Station, RBS, for supporting uplink transmissions from a User Equipment, UE, using Transmission Time Interval, TTI, bundling, the method comprising:
    transmitting a first signal to the UE, requesting the UE to toggle a TTI bundling mode of the UE,
    receiving a second signal from the UE, indicating that the UE has successfully toggled the TTI bundling mode of the UE, and
    during a time interval between transmitting the first signal and receiving the second signal:
    scheduling uplink transmissions from the UE as TTI bundling transmissions, decoding the uplink transmissions received from the UE at time instances for both normal transmissions and the TTI bundling transmissions, and transmitting acknowledgement, ACK, signals to the UE via Physical Hybrid Automatic Repeat Request Indicator Channel, PHICH, at time instances for both normal transmissions and the TTI bundling transmissions.

10. The method according to claim 9, further comprising, during the time interval between transmitting the first signal and receiving the second signal, transmitting grant signals to the UE indicating a new transmission grant.

11. The method according to claim 10, wherein the grant signals comprise a New Data Indicator, NDI, and a Redundancy Version Indicator, RVI, and wherein the NDI is toggled in comparison to a current NDI value for the UE and RVI=0.

12. The method according to claim 9, further comprising, during the time interval between transmitting the first signal and receiving the second signal, scheduling uplink transmissions from the UE with a fixed transport block size, a fixed modulation-coding scheme, and a fixed resource block.

13. The method according to claim 9, wherein the first signal is a Radio Resource Control, RRC, Reconfiguration Request, and the second signal is an RRC Reconfiguration Complete.

14. The method according to claim 9, wherein the first signal is transmitted in response to a decision to toggle the TTI bundling mode of the UE.

15. The method according to claim 9, further comprising, outside the time interval between transmitting the first signal and receiving the second signal:

scheduling a second uplink transmissions from the UE in accordance with a current TTI bundling mode of the UE, decoding the second uplink transmissions received from the UE at time instances for either the normal transmissions or the TTI bundling transmissions, in accordance with the current TTI bundling mode of the UE, and transmitting ACK signals to the UE via the PHICH at time instances for either the normal transmissions or the TTI bundling transmissions, in accordance with the current TTI bundling mode of the UE.

16. The method according to claim 9, wherein the RBS is an eNodeB.

17. A non-transitory computer program comprising computer program code, the computer program code being executed on a processor to implement the method according to claim 9.

18. A non-transitory computer program product comprising a computer readable storage medium, the computer readable storage medium having the computer program according to claim 17 embodied therein.

* * * * *